MOORE & AYLWERD.
Horse Holder.
No. 90,865.
Patented June 1, 1869.
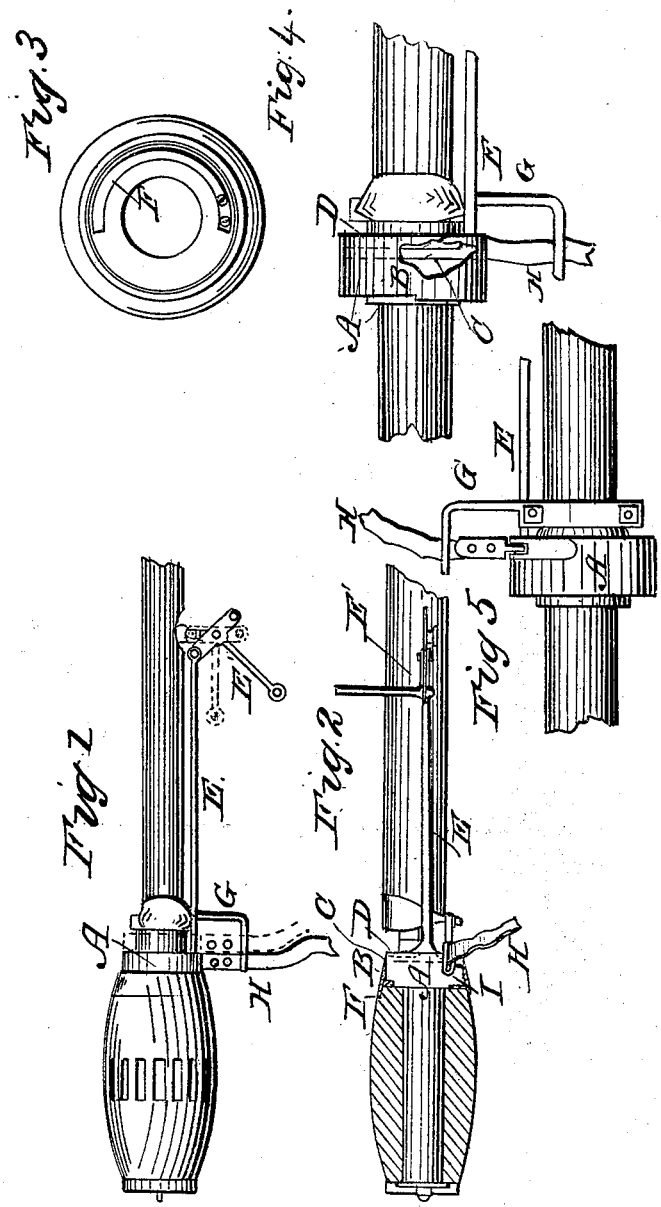

AUGUSTUS MOORE AND JOHN AYLWERD, OF MISSION OF SAN JOSÉ, CALIFORNIA.

Letters Patent No. 90,865. dated June 1, 1869.

DEVICE FOR HOLDING HORSES ATTACHED TO CARRIAGES.

The Schedule referred to in these Letters Patent and making part of the same.

*To all whom it may concern:*

Be it known that we, AUGUSTUS MOORE and JOHN AYLWERD, of the Mission of San José, county of Alameda, and State of California, have invented certain new and useful Improvements in "Horse-Holders;" and we do hereby declare that the following description, and accompanying drawings, are sufficient to enable any person skilled in the art or science to which it most nearly appertains, to make and use our said invention, or improvements without further invention or experiments.

The nature of our invention is to provide an improved horse-holder, so constructed and arranged to operate that when the animal starts forward, the turning of the wheels of the vehicle will arrest his progress at a certain point, and so on, where all forward and backward movements are made.

Our invention consists of an eccentric collar, which loosely surrounds the axle, back of the hub, and is provided with a slot in which easily turns a ring, to which is attached a rod extending longitudinally with the axle to its centre. The end of this rod is connected to a flat T-shaped bar, which turns on a lug, or projection which is attached to the axle, and is for the purpose of throwing the eccentric collar in and out of connection. The lines are attached to the eccentric collar at each side of the wagon. A flat spring is attached to the large end of the hub, which is surrounded and concealed by the hub-band.

To more fully illustrate and explain our invention, reference is had to the accompanying drawings, and letters marked thereon, of which—

Figure 1 is a plan.
Figure 2, a side view.
Figure 3, end view of hub.
Figure 4 represents a view of the rod, line, and line-holder, with eccentric collar broken away to show the ring.
Figure 5 shows the attachment of the line-holder to the eccentric collar.

Similar letters indicate like parts in each of the figures.

A is the collar, which is cut away at the outer edge to form a shoulder, B, and at the inner edge to admit the ring C, which is kept in place by a washer or stationary ring, D, whereby a groove is formed, allowing the collar to be easily rotated. A rod, E, is attached to each of the rings C, if the device is employed for both shoulders of the axle, and extends longitudinally to near the centre of the axle, where it is connected to a flat, T-shaped bar, E', which in turn is pivoted to a lug or projection made fast to the axle.

A lever may extend up through the forward part of the wagon, within easy reach of the driver, the lower end being connected to the bar below, and by the turning of the lever one-fourth of a circle, the collar or collars will be thrown out of connection with a flat spring, F, which is attached to the inner end of the hub. When the device is in connection, the end of the spring flies out against the shoulder on the edge of the eccentric collar, in which position the collar is held, and as the wheels are rotated, the collar is carried around with them, and the lines wound upon it until the progress of the animal is arrested; and when he attempts to back the wheels and vehicle, the spring is carried back against the hub, and a slight relaxation of the tension is imparted to the lines, or until they are arrested by the opening of the jointed arm G on the collar, to which each line H may be attached.

The lines pass through a slot, I, made at the end of an arm which is clipped to the axle, and they may extend up through the bottom of the wagon or vehicle and rest on the dash-board, and extend to the bridle, to be connected in the usual way.

By this means we have a reliable check upon the horse, which is self-regulating, and which operates with equal facility for one or more animals, and without danger to them or liability of damage to the vehicle.

Having thus described our invention,
What we claim, and desire to secure by Letters Patent, is—

The ring C, to which is attached the strap H, when used in connection with bent arm G, and combined with connecting-rod E and T-shaped bar E', as described, for the purpose set forth.

In witness whereof, we have hereunto set our hands and seals.

AUGUSTUS MOORE. [L. S.]
JOHN AYLWERD. [L. S.]

Witnesses:
C. W. M. SMITH,
J. A. M. YONGE.